(12) United States Patent
Stager et al.

(10) Patent No.: US 8,180,740 B1
(45) Date of Patent: May 15, 2012

(54) SYSTEM AND METHOD FOR ELIMINATING DUPLICATE DATA BY GENERATING DATA FINGERPRINTS USING ADAPTIVE FIXED-LENGTH WINDOWS

(75) Inventors: Roger Keith Stager, Livermore, CA (US); Craig Anthony Johnston, Livermore, CA (US)

(73) Assignee: NetApp, Inc., Sunnyvale, CA (US)

( * ) Notice: Subject to any disclaimer, the term of this patent is extended or adjusted under 35 U.S.C. 154(b) by 345 days.

(21) Appl. No.: 12/539,867

(22) Filed: Aug. 12, 2009

(51) Int. Cl.
*G06F 7/00* (2006.01)
*G06F 17/00* (2006.01)

(52) U.S. Cl. ........................ 707/692; 707/660

(58) Field of Classification Search ................. None
See application file for complete search history.

(56) References Cited

U.S. PATENT DOCUMENTS

| | | | |
|---|---|---|---|
| 5,990,810 A | 11/1999 | Williams | |
| 6,744,388 B1* | 6/2004 | Khu | 341/51 |
| 7,761,425 B1* | 7/2010 | Erickson et al. | 707/649 |
| 7,860,843 B2* | 12/2010 | Dodd et al. | 707/693 |
| 2002/0169934 A1* | 11/2002 | Krapp et al. | 711/159 |
| 2003/0039381 A1* | 2/2003 | Ziesig | 382/124 |
| 2005/0044561 A1* | 2/2005 | McDonald | 725/18 |
| 2005/0091234 A1* | 4/2005 | Hsu et al. | 707/100 |
| 2005/0091275 A1* | 4/2005 | Burges et al. | 707/104.1 |
| 2006/0041597 A1* | 2/2006 | Conrad et al. | 707/200 |
| 2007/0118709 A1* | 5/2007 | Tysowski et al. | 711/165 |
| 2007/0130188 A1* | 6/2007 | Moon et al. | 707/101 |
| 2007/0186066 A1* | 8/2007 | Desai et al. | 711/162 |
| 2007/0250674 A1* | 10/2007 | Fineberg et al. | 711/162 |
| 2007/0255758 A1* | 11/2007 | Zheng et al. | 707/200 |
| 2007/0283078 A1* | 12/2007 | Li et al. | 711/103 |
| 2008/0005141 A1* | 1/2008 | Zheng et al. | 707/101 |
| 2008/0013830 A1 | 1/2008 | Patterson et al. | |
| 2008/0034268 A1* | 2/2008 | Dodd et al. | 714/755 |
| 2008/0133446 A1* | 6/2008 | Dubnicki et al. | 707/1 |
| 2008/0155192 A1* | 6/2008 | Iitsuka | 711/114 |
| 2008/0244172 A1* | 10/2008 | Kano | 711/112 |
| 2008/0244204 A1* | 10/2008 | Cremelie et al. | 711/162 |
| 2009/0171888 A1* | 7/2009 | Anglin | 707/2 |

OTHER PUBLICATIONS

Demystifying data deduplication, Mandagere et al, Middleware '08 Companion, Dec. 1-5, 2008.*
Using audio fingerprinting for duplicate detection and thumbnail generation, Burges et al, IEEE 2005.*
Duplicate Management for reference data, Denehy et al, IBM research report, Oct. 7, 2003.*

(Continued)

*Primary Examiner* — Pierre Vital
*Assistant Examiner* — Augustine Obisesan
(74) *Attorney, Agent, or Firm* — Perkins Coie LLP

(57) ABSTRACT

A method and system for generating data fingerprints is used to de-duplicate a data set having a high level of redundancy. A fingerprint generator generates a data fingerprint based on a data window. Each byte of the data set is added to the fingerprint generator and used to detect an anchor within the received data. If no anchor is detected, the system continues receiving bytes until a predefined window size is reached. When the window size is reached, the system records a data fingerprint based on the data window and resets the window size. If an anchor is detected, the system extends the window size such that the window ends a specified length after the location of the anchor. If the extended window is greater than a maximum size, the system ignores the anchor. The generated fingerprints are compared to a fingerprint database. The data set is then de-duplicated by replacing matching data segments with references to corresponding stored data segments.

28 Claims, 6 Drawing Sheets

OTHER PUBLICATIONS

Duplicate data elimination in a SAN file system, Hong et al, Proceedings of the 21st IEEE / 12th NASA Goddard Conference on Mass Storage Systems and Technologies (MSST (2004), pp. 301-314, 2004.*

A duplicate-aware data replication, Jianfeng et al, Joint Workshop on Frontier of Computer Science and Technology, Japan, 2008.*

Efficient Archival Data Storage, You et al, Technical report, Jun. 2006.*

The strength of syntax based approaches to dynamic network intrsuion detection, Scheirer et al., IEEE 2006.*

Fingerprinting to identify repeated sound events in long-duration personal audion recordings, Ogle et al., ICASSP 2007.*

PRUN: Eliminating Information Redundancy for Large Scale Data Backup System, Won et al., IEEE Jul. 15, 2008.*

Watermill: An Optimized Fingerprinting System for Highly Constrained Data, Constantin et al., MM-SEC, Aug. 1-5, 2005.*

U.S. Appl. No. 11/105,895, filed Apr. 13, 2005, Zheng et al.

Reichenberger, C., "Delta Storage for Arbitrary Non-Text Files," Johannes Kepler University, Linz, Austria, K331670@ALIKJU11, 1991 (9 pages).

* cited by examiner

SYSTEM AND METHOD FOR ELIMINATING DUPLICATE DATA BY GENERATING DATA FINGERPRINTS USING ADAPTIVE FIXED-LENGTH WINDOWS

BACKGROUND

A storage server can include one or more storage devices that enable users to store and retrieve information. A storage server can also include a storage operating system that functionally organizes the system by invoking storage operations in support of a storage service implemented by the system. They may be implemented using various storage architectures, such as network-attached storage (NAS), storage area network (SAN), or a disk assembly directly attached to a client or host computer. The storage devices are typically disk drives organized as a disk array, but can be other types of devices, such as solid-state drives or flash memory.

In many industries, such as banking, government contracting, and securities, selected data must be stored in an immutable manner for long periods of time. Typically, storage servers use data backup (e.g., to electronic tape media) to ensure that the data is protected in the event of a hardware failure. Tape backup has several disadvantages, including slow data access and often the requirement that the backup administrator manage a large number of physical tapes. As an alternative, several storage server vendors provide virtual tape library (VTL) systems that emulate tape storage devices using multiple disk drives. In a typical VTL environment, the primary storage server performs a complete backup operation of the storage server's file system (or other data store) to the VTL system. Often, the data being backed up changes very little between backups. This duplication can waste significant amounts of storage space. Some VTL systems also perform replication, in which the data being backed-up is mirrored to a remote storage server rather than stored on a local storage device. For these systems, the data duplication results in duplicated data being unnecessarily mirrored to the remote system, wasting network resources.

Existing techniques for reducing data duplication ("de-duplication") have significant disadvantages. In general, de-duplication is performed by detecting blocks of data that are repeated within a single backup or in multiple backups stored by the data system. For any specific sequence of data, the VTL system can replace other instances of the same data with a reference to a single copy of the data. The single copy may be located within the backup or stored separately in a database. This technique may be used to reduce the size of the backup before it is stored on the disk or replicated to a separate mirror server.

A key challenge for de-duplication is detecting duplicated blocks of data. Systems cannot simply compare every possible data block, because the number of comparisons would be extremely large. To reduce the complexity to a manageable level, some backup systems use data "fingerprints" or hashes to reduce the amount of data to be compared. A data fingerprint is a value (e.g., a bit string) generated from an arbitrarily large data set using a fingerprinting algorithm. The fingerprinting algorithm can be, for example, a hashing algorithm such as SHA-1, SHA-256, or SHA-512. If two data sets are different, the fingerprinting algorithm will produce different fingerprints.

Some techniques use fixed size data blocks to generate the data fingerprints. As a data set is received, the backup system generates a data fingerprint for each fixed size block received (e.g., for each 16 KB block of data). The system then compares each data fingerprint to a database of stored fingerprints to detect duplicate blocks. An advantage of this technique is its simplicity—the system only performs one fingerprint operation for each data block. However, this method does not work well if data is added or deleted from a data block in between backups of a storage device. For example, if a single section of data is inserted in the middle of a data set that has previously been backed up, the data after the insertion in the data set will be shifted relative to the data blocks from the previous backup. Even though the data after the insertion is not changed, the duplication will not be detected because the data is divided into blocks differently in the second data set.

Some de-duplication techniques attempt to solve this problem by using variable sized data blocks or rolling hashes to generate data fingerprints. For example, some systems evaluate multiple window sizes based on a single starting point and select a window size based on a comparison function. However, these techniques tend to be computationally intensive and difficult to execute with reasonable efficiency. In particular, these techniques require that the system calculate a number of hashes and/or perform a large number of comparison operations.

SUMMARY

The present disclosure is directed to a method and system for generating data fingerprints for use in reducing data duplication in a data set. When a data set is received by the system, the system processes the data set to generate a set of data fingerprints associated with individual sections of the data set. When the system detects a data fingerprint matching a stored data fingerprint in a fingerprint database, it replaces the data corresponding to the detected data fingerprint with a reference to the stored data fingerprint. The system initially defines a data window based on an initial data window size. As data is processed, the system attempts to detect an anchor within the data window. If an anchor is detected within the data window, the system extends the data window such that the data window ends a specified length after the location of the anchor. When the system reaches the end of the data window, it generates a data fingerprint based on the contents of the window. If the data fingerprint has not been seen before, the system stores the data fingerprint and the contents of the data window in the fingerprint database. By extending the window as disclosed, the system ensures that the first data window after an anchor starts at a known position (i.e., a fixed length after the anchor), even if the data window would otherwise have had a different starting point.

An advantage of this method is that it does not add significant processing overhead compared to the fixed block size technique. In particular, if the data set does not contain an anchor, the method operates identically to the fixed size data block technique by generating data fingerprints based on the initial data window size. However, the method has the further advantage of being more robust in handling data deletions or insertions. As discussed above, when data is inserted in a data set in a fixed block size system, data after the insertion is a duplicate of data from the previous data set but is grouped into different data blocks. By extending the data window to end a fixed length after an anchor, the fingerprint system can realign the data windows so that data windows starting after the anchor are aligned with the data windows from the previous data set. The data windows after the anchor can then be de-duplicated, saving significantly more space than the fixed block size technique. The system is also more efficient than other systems that use variable block size because it does not require expensive comparison operations to determine the block size.

DETAILED DESCRIPTION

A method and system for generating data fingerprints to de-duplicate a data set is disclosed (hereinafter called "the fingerprint system" or "the system"). The system may be used in a virtual tape library (VTL) system configured to backup data sets that have a high level of redundancy. When a data set is received, the system processes the data set to generate a set of data fingerprints associated with individual sections of the data set. These data fingerprints are stored in a fingerprint database such that the data fingerprint may be used as an index to look up a data segment corresponding to the data fingerprint. When the system detects a data fingerprint matching a stored data fingerprint in the fingerprint database, it replaces the data corresponding to the detected data fingerprint with a reference to the stored data fingerprint. The de-duplicated data set may be stored in a local storage component or replicated to a mirror server using a data network.

The system generates the data fingerprints using an algorithm that can be executed either in real time (by processing each new data unit of the data set as it is received) or as a post-processing step. A fingerprint generator generates a pseudo-unique fingerprint based on the data in a data window using known hashing algorithms, such as SHA-1, SHA-256, or SHA-512. As each byte in the data set is received, the system adds the byte to the fingerprint generator. The system also attempts to detect an anchor within the received data. As used herein, an anchor is a point within a data set that may be used to define a region of interest for potential data de-duplication. An anchor has one or more characteristics that can be recognized at a later point in that data set or in another data set. If no anchor is detected in the data stream, the system continues receiving bytes until a predefined window size is reached. When the window size is reached, the system records a data fingerprint based on the data window and resets the window size, if the window size has been changed. If an anchor is detected, the system extends the window size such that the window ends a specified length after the location of the anchor. If the extended window is greater than a maximum size, the system ignores the anchor.

Figure 1:
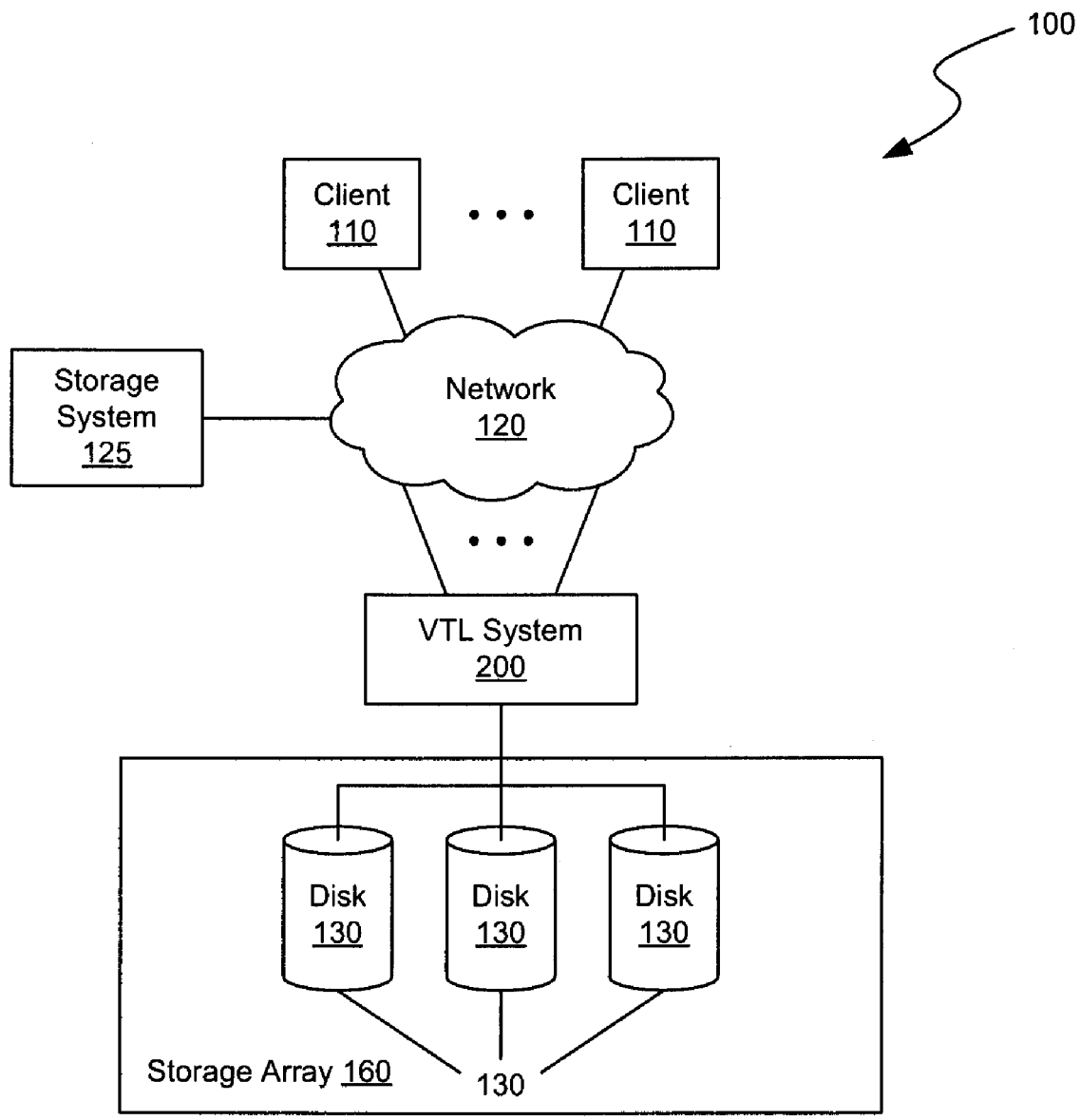
FIG. 1 is a schematic block diagram of a storage server environment.

FIG. 1 is a schematic block diagram of a storage system environment 100. The storage system environment 100 includes a storage server 125 interconnected with a plurality of clients 110 by network 120. A virtual tape library (VTL) system 200 is also interconnected with the network 120. The VTL system 200 is connected to one or more storage devices, such as disks 130, which are organized as a storage array 160. The network 120 may be, for example, an Ethernet network, a Fibre Channel (FC) network, or a combination of these. For example, the clients 110 may be connected to the storage server 125 through an Ethernet network, while the VTL system 200 is connected to the storage server 125 through a FC network.

In operation, the storage server 125 services data access requests from the clients 110. Each client 110 may be a general-purpose computer configured to execute applications and interact with the storage server 125 in accordance with a client/server model of information delivery. That is, the client may request the services of the storage server, and the system may return the results of the services requested by the client, by exchanging data packets over the network 120. The clients may use file-based access protocols, such as the Common Internet File System (CIFS) protocol or Network File System (NFS) protocol, over TCP/IP when accessing information contained in data containers, such as files and directories. Alternatively, the client may use block-based access protocols, such as the Small Computer Systems Interface (SCSI) protocol encapsulated over TCP (iSCSI) and SCSI encapsulated over Fibre Channel (FCP), when accessing information.

The VTL system 200 appears to the storage server 125 as a remote tape drive; thus, the storage server 125 may perform a conventional tape backup operation to the VTL system 200 by using conventional tape backup software. Typically, the backup operation is executed by copying the entire file system stored by the storage server 125 to the VTL system 200. As noted above, each backup copied to the VTL system 200 may include significant amounts of duplicated data, i.e., data that remains common among each of the backups of storage server 125 and/or redundant data between backups of different clients 110.

Figure 2:
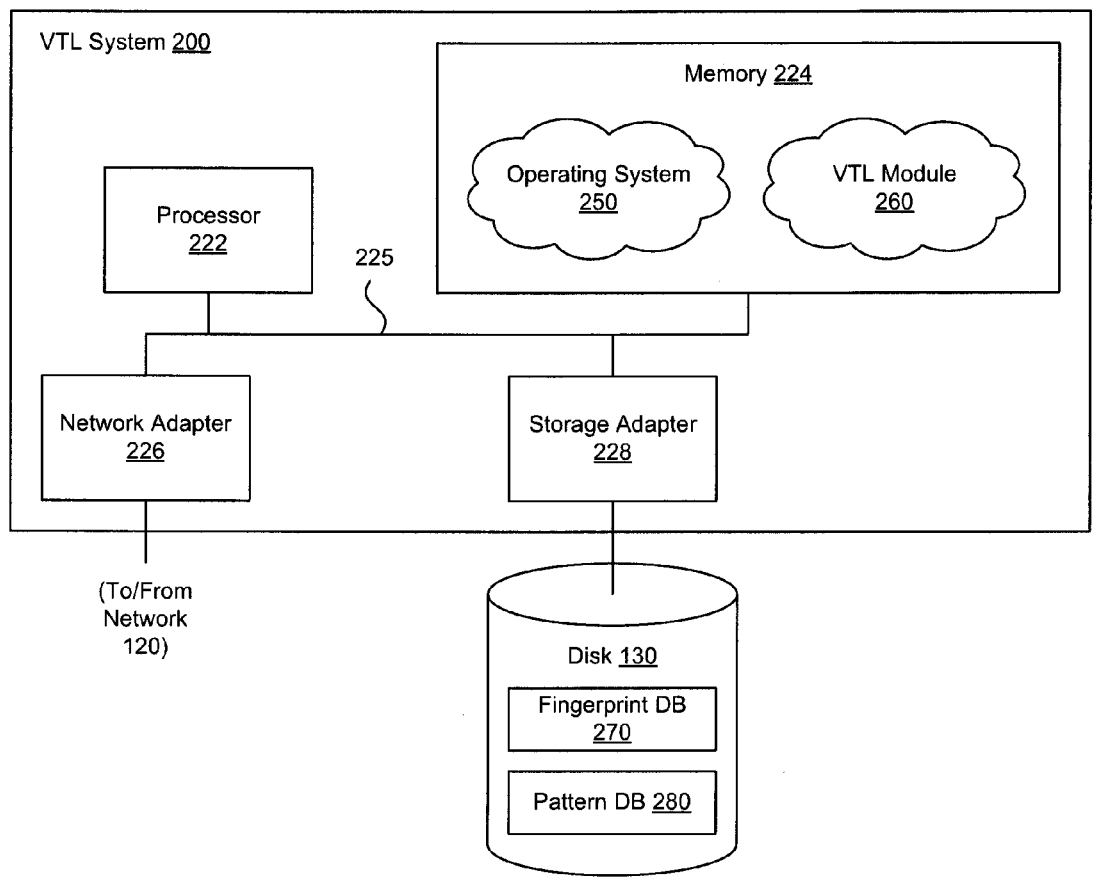
FIG. 2 is a schematic block diagram of a VTL system suitable for use with a fingerprint system.

FIG. 2 is a schematic block diagram of a VTL system 200 suitable for use with the fingerprint system. The VTL system 200 includes one or more processors 222 and memory 224 coupled to an interconnect 225. The interconnect 225 shown in FIG. 2 is an abstraction that represents any one or more separate physical buses, point-to-point connections, or both connected by appropriate bridges, adapters, or controllers. The interconnect 225, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 222 include central processing units (CPUs) of the VTL system 200 and, thus, control the overall operation of the VTL system 200. In certain embodiments, the processor(s) 222 accomplishes this by executing software or firmware stored in memory 224. The processor(s) 222 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 224 is or includes the main memory of the VTL system 200. The memory 224 represents any form of random access memory (RAM), read-only memory (ROM), flash memory, or the like, or a combination of such devices. In use, the memory 224 stores, among other things, the operating system 250 of the VTL system 200. The operating system 250 may implement a logical data object store on disks 130 for use by applications such as VTL module 260. Alternatively, the logical data object store may be managed directly by the VTL module 260. As described in greater detail below, the logical data object store includes an anchor database (DB) 270 and a fingerprint DB 280. The memory 224 may also store a VTL module 260 containing software suitable for configuring the processor 222 to execute VTL functionality. Alternatively, some or all of the VTL functionality may be implemented by one or more hardware components as described above.

A storage adapter 212 and a network adapter 226 are also connected to the processor(s) 222 through the interconnect 225. The storage adapter 212 allows the VTL system 200 to access the disks 130 and is, for example, a Fibre Channel adapter or a SCSI adapter. The network adapter 226 provides the VTL system 200 with the ability to communicate with remote devices, such as clients, over a network 220 and is, for example, an Ethernet adapter.

Figure 3:
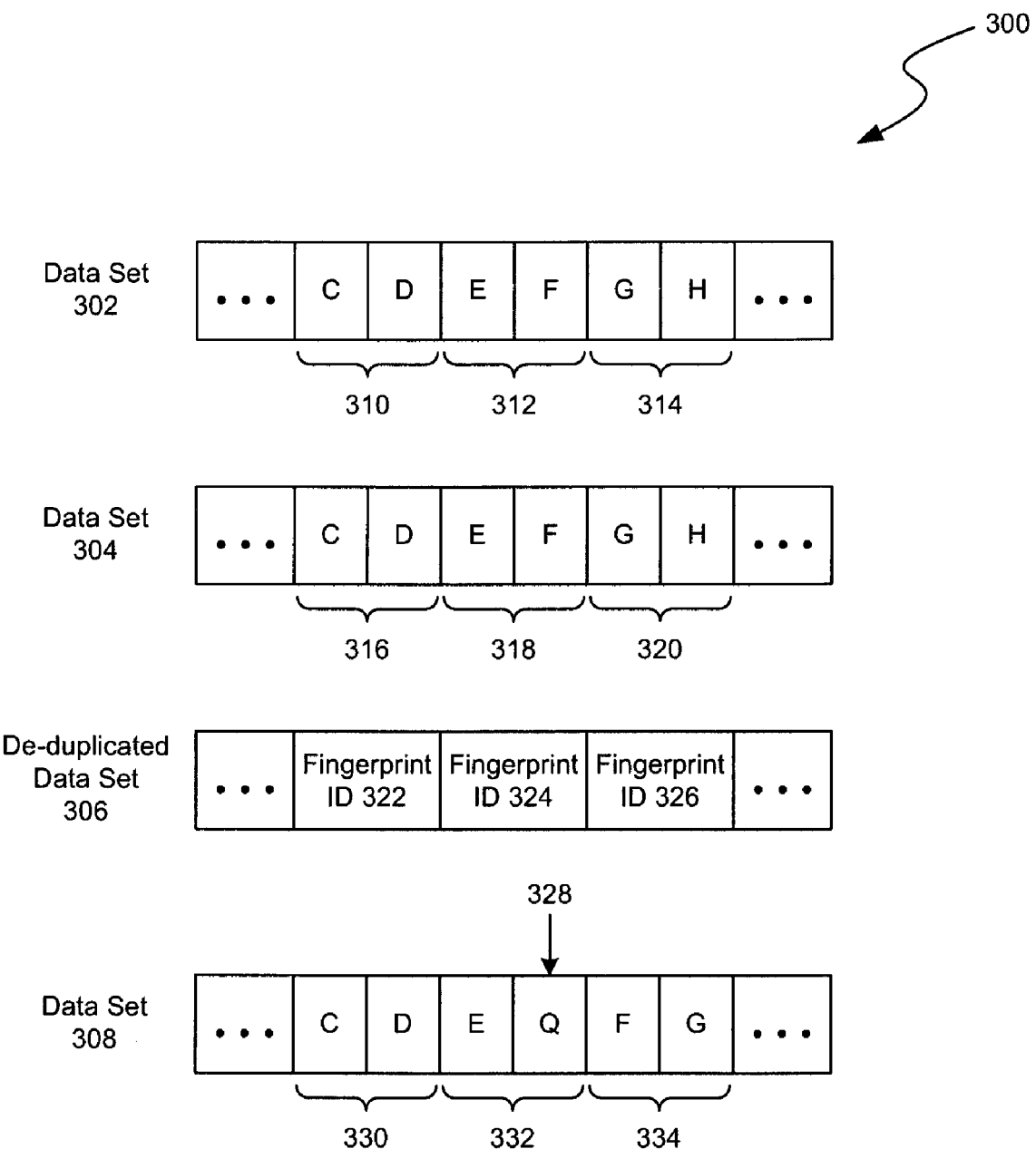
FIG. 3 illustrates the application of fixed block size de-duplication on a group of data sets received by the VTL system.

FIG. 3 illustrates the application of fixed block size de-duplication on a group 300 of data sets received by the VTL system 200. These data sets may be generated, for example, by successive backups of a particular file system. In particular, the group 300 includes data set 302, which is a baseline backup of the file system. As shown in the figure, data set 302 is divided into fixed size blocks 310, 312, and 314, as well as additional data blocks not shown in the figure. Data set 304 includes an identical set of data in data blocks 316, 318, and 320. In a fixed block size de-duplication system, the system generates data fingerprints for each of the blocks 310, 312, and 314. The system then stores the fingerprints and the contents of the blocks in a fingerprint database, such as the fingerprint DB 280. When the data set 304 is received, the system generates new data fingerprints for each of the data blocks 316, 318, and 320. When the system determines that the data fingerprints of blocks in the data set match stored data fingerprints, the system replaces the data blocks with references to locations in the fingerprint DB 280. Thus, in de-duplicated data set 306, each of the blocks 316, 318, and 320 have been replaced with, respectively, fingerprint IDs 322, 324, and 326. Because each fingerprint ID 322, 324, and 326 consumes significantly less space than the corresponding data blocks 316, 318, and 320, the resulting de-duplicated data set 306 is significantly smaller than the original data set 304.

The group of data sets 300 also includes data set 308, which is nearly identical to data set 302 but has a single insertion at point 328. As shown in the figure, block 330 of data set 308 is identical to block 310 of data set 302. However, the following block 332 differs from the corresponding block 312 in data set 302 because of the inserted element at point 328. Successive blocks, such as block 334, also differ from the corresponding blocks in data set 302 because the single insertion has introduced an offset from the original data set. Thus, to an algorithm using fixed size blocks, data set 308 is almost entirely different from data set 302 and its size can only be reduced by a small amount. A similar problem occurs when data is deleted from the data set. However, an adaptive algorithm could regain most of the reduction that was possible with data set 304.

Figure 4:
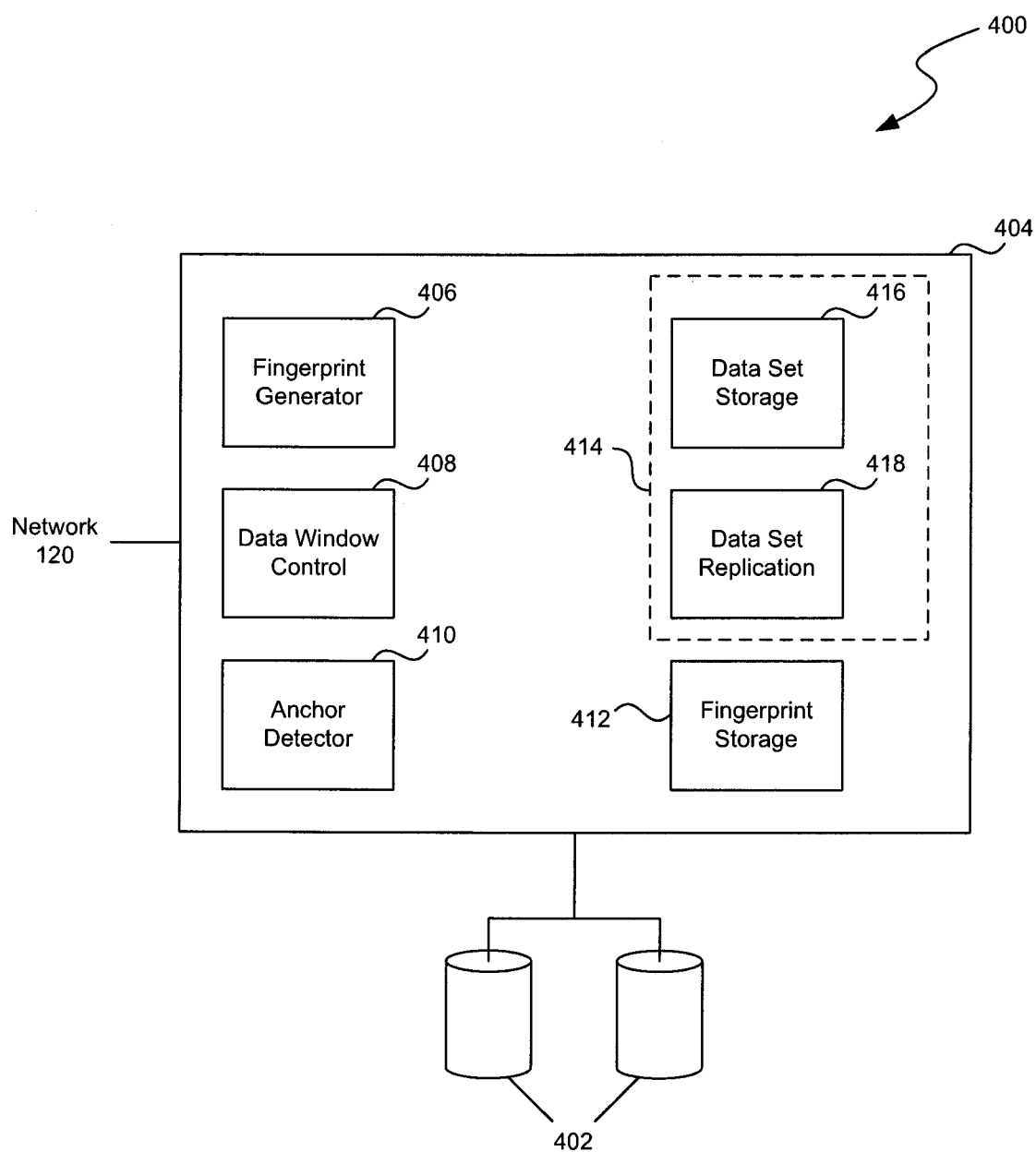
FIG. 4 is a logical block diagram of the fingerprint system.

FIG. 4 is a logical block diagram of a fingerprint system 400 according to the techniques introduced here. The system 400 may be implemented using hardware such as the VTL system 200 depicted in FIG. 2. The system 400 provides functionality to generate data fingerprints based on a received data set and to de-duplicate the data set based on the generated fingerprints. Aspects of the system may be implemented as special purpose hardware circuitry, programmable circuitry, or a combination of these. As will be discussed in additional detail herein, the system 400 includes a number of modules to facilitate the functions of the system. Although the various modules are described as residing in a single server, the modules are not necessarily physically co-located. In some embodiments, the various modules could be distributed over multiple physical devices and the functionality implemented by the modules may be provided by calls to remote services. Similarly, the data structures could be stored in local storage or remote storage, and distributed in one or more physical devices. Assuming a programmable implementation, the code to support the functionality of this system may be stored on a computer-readable medium such as an optical drive, flash memory, random access memory (RAM), read-only memory (ROM), or a hard drive. One skilled in the art will appreciate that at least some of these individual components and subcomponents may be implemented using, for example, application specific integrated circuits (ASICs), programmable logic devices (PLDs), or a general-purpose processor configured with software and/or firmware.

As shown in FIG. 4, the system 400 includes a data connection to the network 120. As discussed above, the system receives backup data sets from the storage server 125 through the network 120. The system then generates data fingerprints and de-duplicates the stream for storage in the VTL system 200 (or for replication to a separate system on the network). The system 400 also includes a storage component 402, which may be the disks 130 shown in FIGS. 1 and 2. The storage component 402 stores the anchor DB 270 and the fingerprint DB 280 shown in FIG. 2. The storage component 402 may also be used to store the de-duplicated data sets generated by the system 400.

The system 400 also includes a processing component 404, which is responsible for analyzing backup data sets and performing the de-duplication algorithms. The processing component 404 includes various modules to assist in execution. It should be noted, however, that the processing component 404 is a logical grouping of functionality. As discussed above, the individual modules may be implemented using separate hardware components and are not necessarily physically collocated.

The processing component 404 includes a fingerprint generator 406, which is configured to generate a data fingerprint based on a specified portion of the data set. The fingerprint generator generates the data fingerprints using any hashing algorithms known in the art, such as SHA-1, SHA-256, or SHA-512. The fingerprint generator 406 operates on an arbitrary data window in the received data set and is not limited to a particular size of data for its execution. The data window is a section of the data set that is used for generating the data fingerprint and is defined by a beginning point and an end point within the data set. The data within the data window is referred to as a data segment.

The processing component 404 includes a data window control component 408, which is configured to control the size of a data window used by the fingerprint generator 406 for generating a data fingerprint. The execution of the data window control component 408 is discussed in greater detail below with reference to FIG. 5A. The processing component 404 also includes an anchor detector component 410, which is configured to process the data set to detect one or more anchors. As stated above, an anchor is part of the data set that may be used to define a region of interest for potential data de-duplication. An anchor can be recognized at later points in the data set and used for re-alignment. Anchors may be detected by, for example, performing a rolling hash on the data set and locating anchors at points where the hash has a selected value. Anchors may also be selected based on location within data containers, e.g., a file, or other contextual information, e.g., at predefined offsets within the data set.

The data window control component 408 and the anchor detector component 410 interact to define the data window used by the fingerprint generator 406. The anchor detector component 410 allows the system to adapt to insertions or deletions in the data set by detecting locations in the data set that were also present in previously received data sets. As discussed above, a problem with using a fixed block size for de-duplication is that the algorithm does not work well in the presence of even a single insertion or deletion. The anchor detector component 410 allows the system to resynchronize with previously processed data sets based on the set of known points (i.e., the anchors) in the newly received data set. Thus, for the group 300 of data sets in FIG. 3, the system could realign the data blocks in data set 308 to be consistent with the data blocks in data set 302 by detecting an anchor at some point after the insertion at point 328.

The processing component also includes a fingerprint storage component 412, which is configured to store new data fingerprints generated by the fingerprint generator 406 in the fingerprint DB 280. After the fingerprint generator 406 generates a new data fingerprint, the fingerprint storage component 412 compares the new data fingerprint to the data fingerprints stored in the fingerprint DB 280. If the new data fingerprint is not already included in the fingerprint DB 280, the fingerprint storage component 412 stores the new data fingerprint in the database together with a data segment containing the contents of the data window used to generate the data fingerprint. In some embodiments, the fingerprint storage component 412 stores the data segment itself in the fingerprint DB 280. In other embodiments, the fingerprint storage component 412 stores a reference to the data segment, while the data segment is stored in a separate location by the data storage component 402. The fingerprint storage component 412 may also store other metadata in the fingerprint DB 280, such as the length of the data window or the data window's position within the data set.

The processing component 404 also includes a data set de-duplication component 414, which uses the data fingerprints generated by the fingerprint generator 406 and the fingerprint DB 280 to de-duplicate the received data sets. The data set de-duplication component 414 compares a new data fingerprint to the data fingerprints stored in the fingerprint DB 280 to determine if the new fingerprint has previously been detected. If the new fingerprint has previously been detected, the data set de-duplication component 414 de-duplicates the data set by replacing the corresponding data segment with a reference to a location in the fingerprint database. In some implementations, the system may confirm the match before replacing the data segment by executing a bitwise compare of the current data segment and the stored data segment.

The data set de-duplication component 414 includes two submodules used to execute specific types of de-duplication based on the data fingerprints. The first submodule is the data set storage submodule 416, which uses the newly generated fingerprint to de-duplicate the data set for storage in the storage component 402. The data set storage submodule 416 replaces a portion of the data set with a reference to the data segment corresponding to the fingerprint and stores the de-duplicated data set in the storage component 402.

The data set de-duplication component 414 also includes a data set replication submodule 418, which de-duplicates the data set before it is transmitted over the network 120 to a second storage server (the "mirror server"). As with the data set storage submodule 416, the data set replication submodule 418 replaces each data window with a reference to a stored fingerprint in the fingerprint DB 280. The data set replication submodule 418 then transmits the references to the mirror server for replication. One skilled in the art will appreciate that these two operations (de-duplication and replication) are roughly equivalent and differ primarily in the location where the data is stored.

Figure 5A:
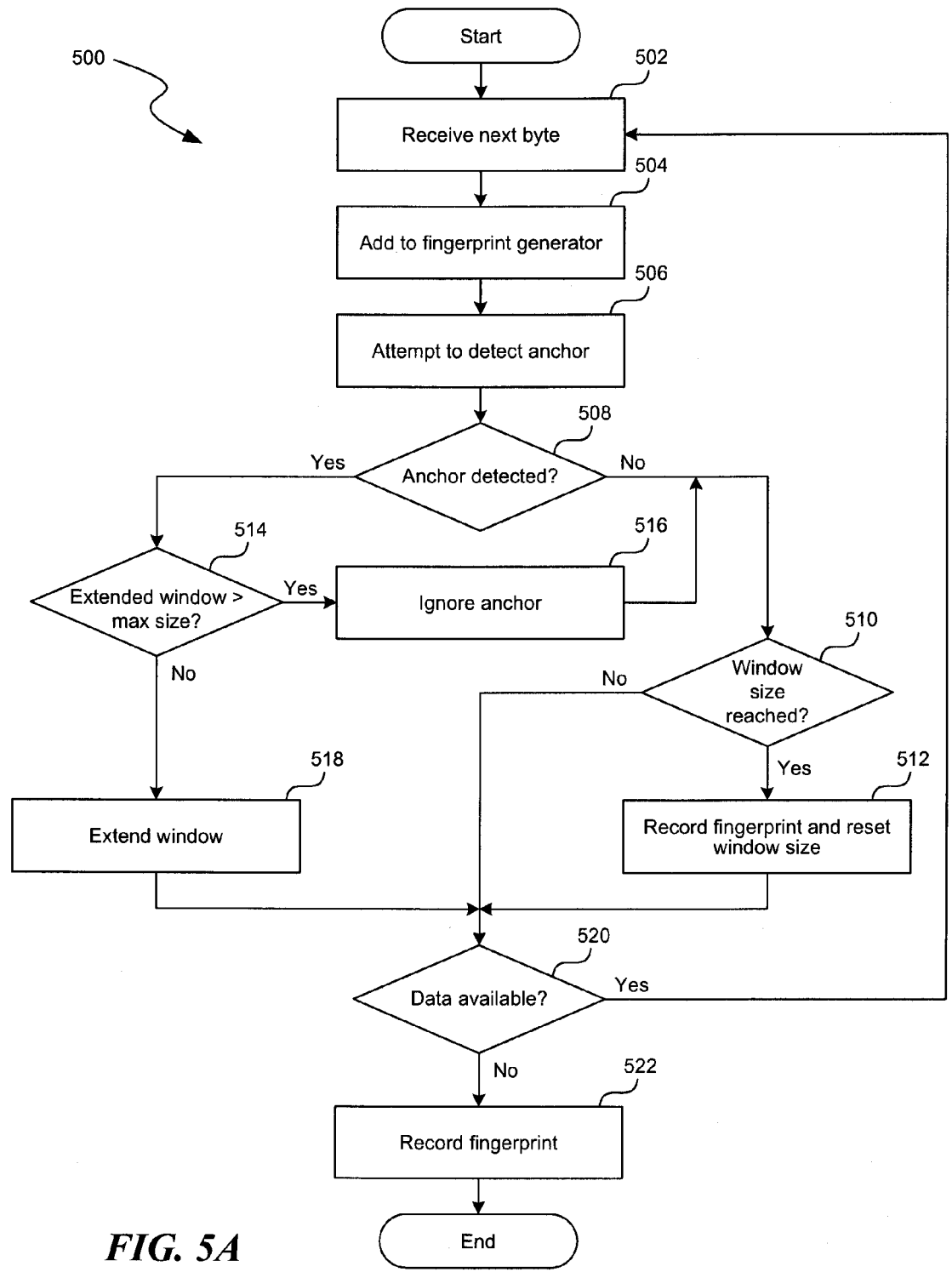
FIG. 5A is a flowchart of a process for generating a data fingerprint according to the fingerprint system.

FIG. 5A is a flowchart of a process 500 for generating a data fingerprint according to the disclosed system. The process 500 operates to adaptively determine a data window size based on characteristics of the data set. The process 500 begins with an initial data window size that is selected based on available memory or other parameters. The initial data window size may be, for example, 16 KB or 32 KB. As discussed below, the process 500 is executed as a continuous loop that processes one data unit at a time until the data set has been completely processed. Thus, the process 500 can be executed in real time or near-real time as the data set is received. The process can also be executed as a post-processing step, in which the complete data set is stored locally and then processed according to the algorithm. In either case, the process functions by receiving each new data unit in the order that the data unit is stored in the data set. In one embodiment (discussed herein), the process 500 operates on individual bytes of the data set. However, the process 500 may also operate on different sized data units, such as two-byte or four-byte words.

Processing begins at block 502, where the system receives the next byte from the data set (or the first byte, if the system is at the beginning of the data set). The system then proceeds to block 504, where it adds the newly received byte to the fingerprint generator 406. In one embodiment, the system adds the byte to a data buffer that stores the data to be used for generating the new data fingerprint. Alternatively, the fingerprint generator 406 may execute continuously, so that it generates a new fingerprint as each byte is added to the fingerprint generator. In this implementation, the system stores the generated fingerprint only at selected times. In either case, the data fingerprint is stored at times determined based on the data window size, as discussed below.

After adding the byte to the fingerprint generator 406, the system proceeds to block 506, where it attempts to detect an anchor based on the received data. The system provides the byte to the anchor detector component 410, which determines whether an anchor has been detected based on the data received up to that point. The window for detecting an anchor is not necessarily the same as the data window for generating the data fingerprint and is generally a fixed size. As discussed above, the system may detect an anchor by executing a rolling hash on the bytes of the data set using standard hashing techniques. After providing the byte to the anchor detector component 410, the system proceeds to decision block 508, where it determines whether an anchor was detected.

If an anchor was not detected in the data set, the process 500 effectively operates as a fixed block size algorithm. If an anchor was not detected in block 508, the system proceeds to decision block 510, where it determines if the data window size has been reached (i.e., if the fingerprint generator has received a number of bytes equal to the data window size). If the system has not detected an anchor in the data set, the data window size is determined based on the initial data window size set by the system. If the data window size has not been reached, the system proceeds to decision block 520 to continue processing the data set. If the data window size has been reached, the system proceeds to block 512, where it records the data fingerprint determined by the current data window, resets the data window size to the initial data window size, and clears the data from the fingerprint generator 406.

If an anchor was detected in block 508, the system proceeds to a second branch of the process 500, in which the system extends the data window. In this branch, the system extends the data window so that it ends a fixed length after the location of the detected anchor, while keeping the same starting point for the window. In effect, the anchor provides a resynchronization point, so that a new data window will always begin a fixed distance after the location of an anchor. As with the initial data window size, the extension amount may be any arbitrary value, such as 16 KB or 32 KB.

The system also defines a maximum data window size parameter that limits the growth of the data window. This is useful to avoid consuming too much memory in the fingerprint generator 406 by having the data window grow without limit. In some embodiments, the maximum size is twice the initial size. Thus, in decision block 514, the system determines whether the data window would be greater than the maximum size if it were extended. If the extended window would be greater than the maximum size, the system proceeds to block 516, where it ignores the anchor and proceeds to the first branch of the method 500 as if the anchor had never been detected. The system then repeats steps 510 and 512 to determine whether the data window size has been reached and record the data fingerprint. If the extended window would not be greater than the maximum size, the system proceeds to block 518, where it extends the window such that the data window ends the fixed length after the location of the anchor. At this point, there is no need to test if the window size has been reached, so processing for the extension branch of the process 500 ends.

After the processing branches have been executed, processing proceeds to decision block 520, where the system determines if additional data is available in the data set. If additional data is available, the system returns to block 502, where it receives the next byte and repeats the steps discussed above. If no more data is available in the data set, the system proceeds to block 522, where it records a data fingerprint based on the remaining data in the fingerprint generator 406. The process then exits.

Figure 5B:
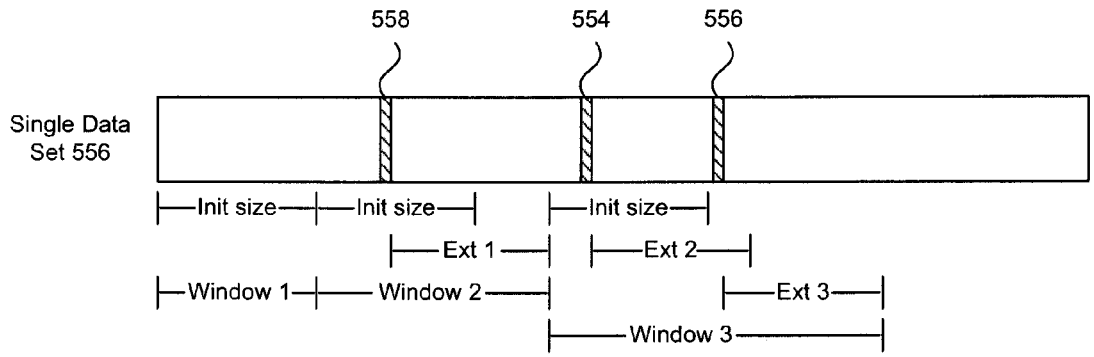
FIG. 5B is an example of the execution of the fingerprint system on a sample data set.

FIG. 5B is an example of the execution of the method 500 on a sample data set 550. As shown in the figure, the sample data set includes anchors at locations 552, 554, and 556. At the beginning of the data set, the system does not detect an anchor within the initial data window. Based on this, the system generates a data fingerprint based on Window 1, which is defined by the initial data window without any extension.

For the second window, the system detects an anchor 552 within the data window defined by the initial window size. The system then extends the data window by the extension amount (Ext 1), such that the data window has the larger size shown as Window 2. As shown in FIG. 5B, there are no additional anchors within the extended window. Therefore, the system generates a data fingerprint based on window 2.

The process executes similarly with the next portion of the data set. However, in this case the anchor points 554 and 556 are closer together. Specifically, anchor point 554 is within the initial data window. Therefore, the system first extends the window by the extension amount (shown as Ext 2). As processing continues using the extended window, the system detects the anchor point 556. In response, the system again extends the data window by the extension amount (Ext 3). As no more anchors exist within the remainder of the extended data window, the system generates a data fingerprint based on the extended data window (Window 3). Although not shown in the figure, if the repeated extensions of the window had exceeded the maximum data window size, the system would have ignored the last detected anchor.

As discussed above, after each data fingerprint is generated (or, alternatively, after all fingerprints have been generated), the system stores any newly detected data fingerprints in the fingerprint DB 280. After generating each data fingerprint, the system may also perform the de-duplication methods discussed above. In particular, the system may look up the data fingerprint in the fingerprint DB 280 and replace the data segment corresponding to the data fingerprint with a reference to a stored data fingerprint in the fingerprint DB 280. The modified data set may then be stored in the storage component 402 or replicated to a mirror server as discussed above.

Figure 5C:
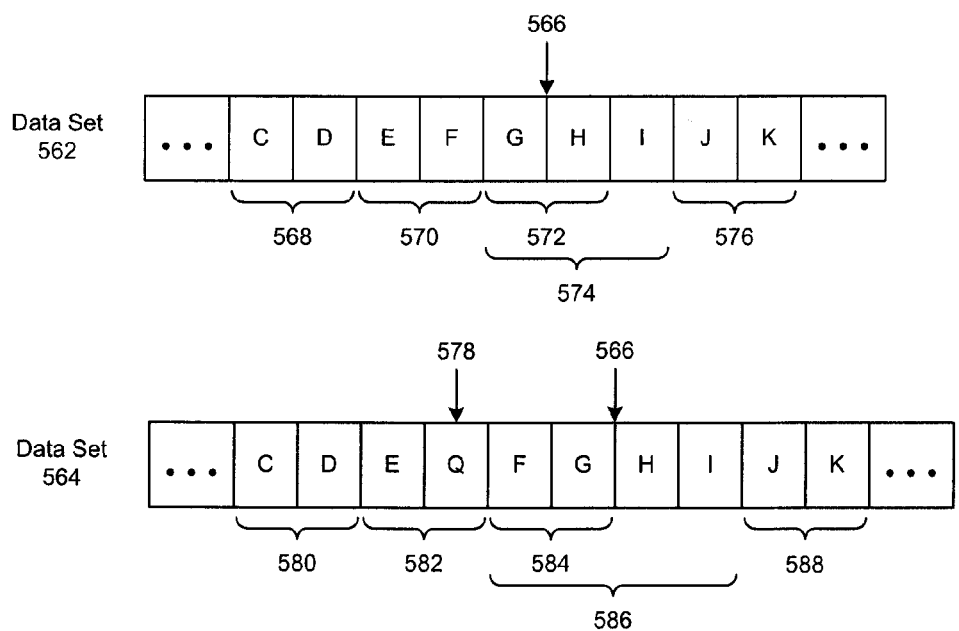
FIG. 5C illustrates an example application of the fingerprint system to a group of data sets received by the VTL system.

FIG. 5C illustrates an example application of the fingerprint system to a group of data sets received by the VTL system. In the example, the initial data window size and the extension amount are both equal to two data units. The data sets 562 and 564 are successive backups of a storage server that are identical except for a single insertion in data set 564 at point 578. In addition, both data sets include an anchor at point 566.

When data sets 562 and 564 are processed according to the method 560 described in FIG. 5A, data windows that do not include an anchor will have a length of the initial data window size (i.e., two data units). Thus, as processing begins for data set 562, the system uses the initial data window size to define data windows 568 and 570, because neither data window contains an anchor. The system then defines initial data window 572 based on the initial data window size with a starting point at the end of data window 570. When the system reaches point 566, it extends data window 572 in response to detecting the anchor. This defines data window 574, which is extended to a length of three data units (i.e., ending two data units after the anchor location at point 566). The final window 576 does not contain an anchor, so the system uses the initial data window size. As each data window is determined, the system generates a data fingerprint based on the contents of the data window and stores the information in the fingerprint DB 280.

The system processes data set 564 in a similar fashion. As with data set 562, the system uses the initial data window size to define data windows 578 and 580 because neither data window includes an anchor. Because the contents of data window 578 are identical to data window 568, the system can replace the contents of the data window with a reference to the fingerprint DB 280, as discussed above. However, the contents of data window 580 have not been seen before, so the system stores the fingerprint information in the fingerprint DB 280. The system then defines initial data window 584 using the initial data window size. Because of the insertion at point 578, the anchor at point 566 is detected at the end of initial data window 584. Based on the detection, the system defines extended window 586 by extending data window 584 to end two data units after the anchor. The system then stores the fingerprint and contents of extended window 586 in the fingerprint DB 280. The system then defines the data window 588, again using the initial data window size. Because the data window 588 does not include an anchor, the system generates a fingerprint based on the contents of the window without extending it. The contents of data window 588 are identical to the contents of data window 576, so data window 588 can then be replaced with a reference to the fingerprint DB 280. Thus, unlike the fixed block size example in FIG. 3, the fingerprint system is able to use the anchor at point 566 to realign the blocks in the data sets 562 and 564. Despite the insertion at point 578, the system was able to determine that data window 586 was identical to data window 574. In addition, any data after these blocks will continue to correspond until the next insertion or deletion in data set 564.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method for removing duplicate data from a sequence of bytes at a storage server, the method comprising:
    generating a first data fingerprint based on a first data interval in the sequence of bytes, the first data interval having a first length;
    detecting an anchor in the sequence of bytes at a point after the first interval;
    defining a second data interval in the sequence of bytes extending from a first position in the sequence to a second position located a specified interval after the location of the anchor, the second data interval having a second length greater than the first length;
    generating a second data fingerprint based on the second window;
    finding a first stored data fingerprint in a data fingerprint database corresponding to the first data fingerprint;
    finding a second stored data fingerprint in the fingerprint database corresponding to the second data fingerprint; and
    generating a modified sequence of bytes by replacing the first data interval in the sequence of bytes with a first storage indicator corresponding to the first stored data fingerprint and replacing the second data interval in the sequence of bytes with a second storage indicator corresponding to the second stored data fingerprint.

2. The method of claim 1, further comprising storing the modified sequence of bytes in a data store.

3. The method of claim 1, further comprising transmitting the modified sequence of bytes to a mirror server.

4. The method of claim 1, wherein the anchor is a first anchor and wherein generating the first data fingerprint comprises:
    detecting a second anchor in the first data interval;
    defining a third data interval ending at a specified length after the location of the first anchor;
    determining whether the length of the third data interval is greater than a maximum size threshold; and
    in response to determining that the length of the third data interval is greater than the maximum size threshold, generating the first data fingerprint based on the first data interval.

5. The method of claim 1, wherein detecting the anchor comprises performing a rolling hash on the sequence of bytes.

6. The method of claim 1, further comprising storing the second data fingerprint and a reference to the contents of the second data interval in a fingerprint database.

7. A storage system for processing a backup data set, the storage system comprising:
    a processor;
    a memory;
    a data provider component configured to receive the backup data set from a storage server;
    an anchor detector component configured to detect an anchor at an anchor location in the backup data set;
    a data window control component configured to:
        define an initial data window in the backup data set extending from a beginning point to a first end point, wherein the initial data window has an initial size; and
        in response to determining that the anchor location is within the initial data window, define an extended data window in the backup data set extending from the beginning point of the initial data window to an end point a specified length after the anchor location, the extended data window having a second size different from the first size;
    a fingerprint generator component configured to generate a data fingerprint based on the portion of the data set in the extended data window;
    a data set de-duplication component configured to detect potentially duplicated data based on the data fingerprint and to generate a de-duplicated data set by replacing the data in the extended fingerprint window with a reference to a stored data segment; and
    a storage interface configured to communicate with a storage facility to store the de-duplicated data set.

8. The storage system of claim 7, further comprising:
    a fingerprint database configured to store a plurality of data fingerprints,
    wherein the data set de-duplication component is configured to detect potentially duplicated data by comparing the generated data fingerprint to the plurality of data fingerprints and wherein the reference is a database reference to an individual stored data fingerprint of the plurality of data fingerprints.

9. The storage system of claim 7, wherein detecting the anchor comprises performing a hash function on a portion of the data set.

10. The storage system of claim 7, further comprising a fingerprint storage component configured to store the generated data fingerprint and a reference to the contents of the extended fingerprint window in a fingerprint database.

11. The storage system of claim 7, wherein the anchor is a first anchor, wherein the anchor location is a first anchor location, wherein the anchor detection component is further configured to detect a second anchor at a second anchor location within the extended data window, and wherein the data window control component is further configured to extend the extended data fingerprint window such that the extended data fingerprint window has an updated end point that is a specified interval after the location of the second anchor.

12. The storage system of claim 7, wherein the data de-duplication component is configured to:
    compare the generated data fingerprint to a stored data fingerprint in a fingerprint database;
    perform a bitwise comparison between the contents of the data fingerprint window and a data segment stored corresponding to the stored data fingerprint;
    based on the comparison, replace a region of the data set defined by the data fingerprint window with a storage indicator corresponding to the stored data fingerprint.

13. The storage system of claim 7, wherein the storage system is a Virtual Tape Library (VTL) system.

14. A method for processing a data set at a storage server, wherein the data set is a sequence of individual data units, the method comprising:
    defining a data fingerprint window in the data set, wherein the data fingerprint window extends from a beginning point to a first end point in the data set, the data fingerprint window having a first size;
    detecting an anchor within the data fingerprint window;
    in response to detecting the anchor within the data fingerprint window, extending the data fingerprint window such that the extended data fingerprint window extends from the beginning point to a second end point that is a specified interval after the location of the anchor, the extended data fingerprint window having a second size different from the first size; and generating a data fingerprint based on the data fingerprint window.

15. The method of claim 14, further comprising:

comparing the generated data fingerprint to a set of stored data fingerprints in a data fingerprint database; and replacing the data in the fingerprint window with a reference to a data segment corresponding to an individual stored data fingerprint in the fingerprint database.

16. The method of claim 14, further comprising:

comparing the generated data fingerprint to a stored data fingerprint in a data fingerprint database; and based on the comparison, transmitting the generated data fingerprint to a mirror server.

17. The method of claim 14, wherein extending the fingerprint window comprises:

determining whether the length of the extended fingerprint window is greater than a maximum size threshold; and in response to determining that the length is greater than the maximum size threshold, ignoring the anchor.

18. The method of claim 14, further comprising generating a data fingerprint based on the beginning point and the first end point when an anchor is not detected in the data fingerprint window.

19. The method of claim 14, wherein identifying the anchor comprises performing a hash function on a portion of the data set.

20. The method of claim 14, further comprising storing the generated data fingerprint and a reference to a region of the data set defined by the extended data fingerprint window in a fingerprint database.

21. The method of claim 14, wherein the anchor is a first anchor and further comprising detecting a second anchor in the data set and extending the extended data fingerprint window such that the extended data fingerprint window has a third end point that is the specified interval after the location of the second anchor.

22. The method of claim 14, further comprising:

comparing the generated data fingerprint to a stored data fingerprint in a fingerprint database;

performing a bitwise comparison between a region of the data set defined by the extended data fingerprint window and a data segment corresponding to the stored data fingerprint;

based on the comparison, replacing the region of the data set defined by the data fingerprint window with a storage indicator corresponding to the stored data fingerprint.

23. A method of facilitating data de-duplication, the method comprising:

receiving a set of data;

attempting to detect an anchor in the set of data by applying a data window of a specified length to the set of data;

if an anchor is detected within the set of data, extending the length of the data window such that the extended data window has a length greater than the specified length, and otherwise maintaining the length of the data window;

computing a data fingerprint for the set of data based on the data window; and using the data fingerprint to detect potentially duplicated data.

24. The method of claim 23, further comprising replacing the potentially duplicated data with a reference to a stored data segment.

25. The method of claim 23, wherein using the data fingerprint comprises comparing the data fingerprint to a set of stored data fingerprints in a data fingerprint database and further comprising:

replacing the data in the data fingerprint window with a storage indicator corresponding to an individual stored data fingerprint in the fingerprint database.

26. The method of claim 23, wherein attempting to detect the anchor comprises performing a hash function on a portion of the set of data.

27. The method of claim 23, further comprising storing the data fingerprint and a reference to a portion of the set of data defined by the data window in a fingerprint database.

28. The method of claim 23, further comprising:

comparing the data fingerprint to a stored data fingerprint in a fingerprint database;

performing a bitwise comparison between a portion of the set of data defined by the data window and a data segment corresponding to the stored data fingerprint;

based on the comparison, replacing the portion of the set of data defined by the data window with a storage indicator corresponding to the stored data fingerprint.

* * * * *